Aug. 3, 1926.
C. H. FRAMPTON
1,594,936
OPTICAL SYSTEM FOR CONDENSING LIGHT
Filed Oct. 18, 1922
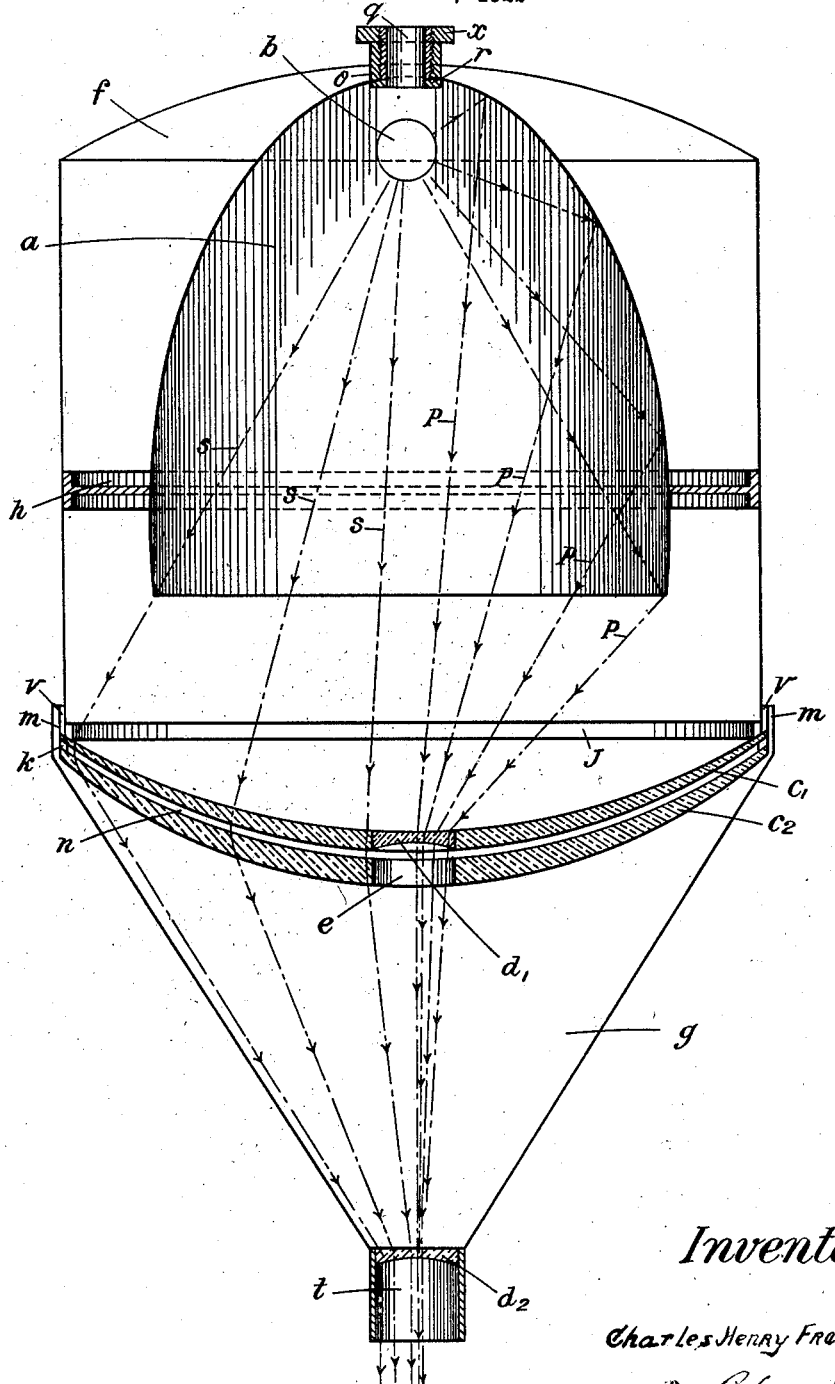
Inventor:
Charles Henry Frampton
By Richards Geier
Attys.

Patented Aug. 3, 1926.

1,594,936

UNITED STATES PATENT OFFICE.

CHARLES HENRY FRAMPTON, OF LONDON, ENGLAND.

OPTICAL SYSTEM FOR CONDENSING LIGHT.

Application filed October 18, 1922, Serial No. 595,278, and in Great Britain October 18, 1921.

This invention relates to an optical illuminating system for use in conjunction with cinema projection apparatus and has for its object to utilize the rays proceeding from a given luminous point to illuminate the film at the gate of the projection apparatus, and to throw a film-image on a screen, in place of utilizing the existing open arc lamp now universally employed.

In accordance with the present invention the beam of light remaining after the divergent pencils of rays emitted from the source of illumination have been reflected by an ellipsoidal reflector or the like the exterior or interior surface of which has been silvered or treated in any manner to convert it into a mirror or reflector, passes through suitable lenses so as to complete the process of concentrating and rendering substantially parallel the rays of light before these latter pass through the film or slide of the projector. The ellipsoid or hood can be made of any material which will serve the required purpose as above set forth.

One form of the improved apparatus is shown in axial section in the accompanying drawing and is adapted to be substituted for the usual existing open arc and lamphouse and is placed in position behind the projector in any practical manner.

The optical combination is encased in a metal box in two parts $f$ and $g$ which close together by the cylindrical half $f$ being fastened to the conical half $g$.

In the rear end of the cylindrical part of the box $f$ is placed the ellipsoidal reflector or hood $a$ which is held in position by the combined holder $o, q, r, x$ and the T ring $h$.

The ellipsoid $a$ is bored or drilled at the apex to allow the passage of the holder $o, q, r, x$ through the said aperture. The shoulder $r$ of the threaded tube $q$ on which the hood rests is secured by the gentle pressure of the screw collar $o$. The tube $q$ is then passed through the top of the box $f$ and is firmly held in position by the knurled screw collar $x$.

Through the centre of the combined holder $o, q, r, x$ passes the lamp holder and wires of the luminant, which may be retained in the correct position by any practical method.

In order to remove all strain from the ellipsoid which might be caused by the said holder, and to give greater strength to the box $f$, the T ring $h$ has ben introduced.

$b$ indicates the correct position for the luminant, it being important that it should occupy a position corresponding with the first conjugate focal point.

All divergent light passing out of the ellipsoidal reflector without having been reflected thereby, becomes incident upon the first surface of the condenser $c_1$ the light which has been made convergent by reflection from the surface of the said hood $a$ becomes incident upon the first minus lens $d_1$ hereinafter mentioned. The rays indicated by the dotted arrow lines $s, s, s$, become, after passing through the second condenser $c_2$, directed to an imaginary point, termed the point of common fusion. The reflected rays viz:—$p, p, p, p$ after passing through the minus lens $d_1$ follow a natural course through an aperture $e$ made in the centre of the second condenser $c_2$ also to the point of common fusion. The condenser as above set forth may be replaced by any similar condenser of suitable power.

In the centre of the first condenser is placed or worked a minus lens or lens combination $d_1$ which may be worked or placed in any practical manner in relative position to a simple single condenser if the latter is preferably employed.

The aperture worked or bored in the centre of condenser $c_2$ must be of equal diameter to that of the minus lens $d_1$.

The final means of producing the desired beam of parallel rays for the projection of films or slides, already set forth, is, in the example illustrated, performed by the introduction of a minus lens or lens combination placed within the point of common fusion. Whether for parallel or slightly convergent light, the diameter of the beam produced should not be more than equal to the diagonal of the gate of the projector.

The condensed parallel beam passes out of the optical system through the short collar or lens carrier $t$, and is then directed to the film.

The condensers $c_1$ and $c_2$ which are mounted in the base of the metal cone $g$ are separated by the ring $k$ and are secured in permanent position by the counter cell $v$, into which latter is fitted the cylindrical box $f$, after having been re-inforced by the ring $j$.

$m$, $m$ indicates a strengthening ring for the base of the conical part of the box $g$.

This invention is intended for use in conjunction with cinema projection apparatus or any apparatus used or employed for the purpose of projection of films or slides, moving or stationary, on to a screen.

By the employment of this invention heat is reduced sufficiently to prevent combustion of the film while held stationary at the gate of the projector for the purpose of examination or demonstration of the film-image thrown on to the screen.

The apparatus herein described may be constructed to any size provided the principal points bear the same relative distances between one another, notably the position of the source of illumination (which is at the first conjugate focal point), the second conjugate focal point, hereinbefore referred to, as the first point of concentration and the point of common fusion. It is also imperative that the curve of the ellipsoid be such that all incident light thereon will be truthfully reflected to the second conjugate focal point.

The optical illuminating system shown is a general construction for the purpose of utilizing practically the entire illuminating energy of the source of light, it being possible to pick up and control all the pencils of rays except those radiating immediately behind the said source.

I claim:

1. Optical apparatus for projecting, as a substantially parallel beam, virtually the whole of the rays issuing from a radiant source of light, comprising an elliposidal reflector at the rear conjugate focal point of which said source of light is placed, and rear and front refracting systems, of which the former consists in the combination with a central refracting element of an annular refracting element surrounding said central element and the other occupies a position in front of such combined central and annular refracting system; the ellipsoidal reflector being adapted to throw upon the central refracting element all that portion of said issuant rays of light which it collects, and the annular refracting element being adapted to collect, virtually the whole remaining portion of the issuant rays; while the central and the annular refracting elements are adapted conjointly to throw upon the front refracting system the rays which they respectively receive, and the front refracting system is of such character and so placed, relatively to the virtual point of common fusion of the rays proceeding from the combined central and annular refracting system, as to be adapted to project in substantial parallelism the rays of light which fall upon it.

2. Optical apparatus as claimed in claim 1, wherein the center of the combined central and annular refracting system is placed approximately at the virtual front conjugate focal point of the ellipsoidal reflecting surface, said combined refracting system being adapted as a whole to direct to a point of common fusion all the rays of light which fall upon it.

3. Optical apparatus as claimed in claim 1, wherein the center of the combined central and annular refracting system is placed in rear of the virtual front conjugate focal point of the ellipsoidal reflecting surface, said combined refracting system being adapted as a whole to direct to a point of common fusion all the rays of light which fall upon it.

4. Optical apparatus as claimed in claim 1, wherein the combined central and annular refracting system comprises a condenser the central portion of which possesses a negative refractive power.

5. Optical apparatus as claimed in claim 1, wherein the combined central and annular refracting system comprises two condensers placed the one in front of the other, one of said condensers having a central portion which possesses a negative refractive power while the other has at its center a clear aperture.

6. Optical apparatus as claimed in claim 1, wherein the combined central and annular refracting system comprises two condensers placed the one in front of the other, the central portion of the rear condenser being constituted by a minus lens fitted into an aperture therein, while the front condenser has at its center a clear aperture to give passage to the rays projected by said minus lens.

7. Optical apparatus for projecting, as a substantially parallel beam, virtually the whole of the rays issuing from a radiant source of light, comprising a concave ellipsoidal reflector adapted to carry the radiant source at its rear conjugate focal point; a rear refracting system whereof the center is placed approximately at the virtual front conjugate focal point of said reflector, and which consists in the combination of a condenser placed in front of the reflector and having a central aperture, a minus lens fitted in said central aperture, and a second condenser placed in front of the first-mentioned condenser and centrally apertured to give passage to the rays projected by said minus lens; and a front refracting system; the ellipsoidal reflector being adapted to collect and throw upon the minus lens the greater part of the rays of light issuing from the radiant source, the two condensers being adapted to collect virtually the whole remaining portion of said rays, and the rear refracting system as a whole being adapted to direct to a point of common fusion the rays of light which fall upon it, while the front refracting system is of such character and so placed relatively to said point of common fusion as to be adapted to project in substantial parellelism the rays of light thrown upon it by the rear refracting system.

CHARLES HENRY FRAMPTON.